Patented Mar. 24, 1953

2,632,758

UNITED STATES PATENT OFFICE 2,632,758

POLYMERIZATION OF METHYLMETHAC-RYLATE WITH MIXTURE OF BENZOYL PEROXIDE AND TERTIARY-BUTYL HYDROPEROXIDE

Abraham Brothman, Long Island City, N. Y.

No Drawing. Application December 11, 1946, Serial No. 715,601

2 Claims. (Cl. 260—89.5)

This invention relates to improvements in the carrying on of or effecting additive polymerizations including all instances in which the focal point or points of the polymerization process are olefinic or acetylenic linkages, or both. These improvements relate to the production of various forms of polymerized products such as sheet and shape forms, molding powders, and components of paint, lacquer and other coating compositions either in liquid or solid condition.

In accordance with my invention it is to be understood that the additive polymerizations include all instances involving any of the following processes or reactions or sequence of processes or reactions:

(1) The formation of an initiated molecule by a phenomenon involving the creation of a point of non-equilibrium at an olefinic or acetylenic linkage, or both, this being achieved by the taking up of one of the valences exchanged between the two carbons involved in the olefinic or acetylenic linkage, or both, by an outside body or action. This procedure amounts to the conversion of a so-called "satisfied" molecule to an "ion."

(2) The addition of a monomer molecule to an initiated molecule, as above, by the phenomenon of the opening of an olefinic or acetylenic linkage in the to-be-added-monomer molecule in a manner involving the taking up of one of the valences exchanged between two olefinic-bond or acetylenic-bond carbons by the initiated molecule, or "ion." This procedure involves the addition of the monomer molecule to the structure of the initiated molecule and the transfer of a point of non-equilibrium from the initiated molecule to the added molecule.

(3) The continued growth of a polymer chain by a succession of repetitive steps involving the duplication of the process of (2) above, that is the repetitive shift of the point of non-equilibrium from the terminal member of a growing chain to the succeeding added monomer molecule.

(4) Effecting chain interruption by collision between: growing chains, a growing chain and an initiated molecule, a growing chain and a free radical or between a growing chain and any body or action capable of satisfying or converting the point of non-equilibrium in the terminal molecule to an equilibrium point. Chain interruption may also be effected by the transfer of the energy of activation from a growing chain to a monomer molecule or by a slackening of activity due to sharply increased molecular weight, or by other action or agents.

In this highly developed art, a number of different means have been developed for catalyzing additive polymerizations, but for the most part, the commercial practice is to use organic peroxides as catalysts to effect the polymerizations.

Regardless of the means of catalysis employed, three main processes for carrying out additive polymerizations are in existence. These are: the "emulsion method," the "solution method" and the "bulk method."

The "emulsion method" comprises the carrying out of the polymerization under conditions of dispersion of the monomeric material, as the discontinuous phase, in a liquid medium, usually water, with which the monomeric material is immiscible. Usually the organic peroxide catalyst is previously dissolved in the monomer and a colloidal agent is used to stabilize the emulsion. The subsequent isolation of the polymer material usually involves:

a. The concentration of the dispersed polymer globules from the main mass of the continuous phase, b. Purification procedures for reducing the presence of colloidal agents in or around the polymer globules to tolerable limits, and c. Drying, or other separation procedures for the elimination of that residuum of the continuous phase which is present in the concentrate from (a).

The "solution method" involves the carrying out of the polymerization under the condition of solution of the monomeric material in an "inert" solvent phase. Here again the organic peroxide catalyst is generally dissolved in the monomeric material prior to dispersion of the monomeric material in the solvent phase. The subsequent isolation of the polymer material most generally involves the distillation of the solvent phase from the polymer mass.

The "bulk method" involves a polymerization system in which the components are limited to the polymerizable material and the catalyst, or a solution of the catalyst, although in general, plasticizers, fillers or other conditioning agents may be present. As distinguished from the emulsion and the solution methods, the bulk polymerization method does not involve any material which must be ultimately separated from the polymer mass.

Broadly speaking, the "emulsion" method has been employed for the production of additive polymer molding powders, while the solution method has been employed for the preparation of components of paint, lacquer and other coating compositions. To date, neither the "emulsion method" nor the "solution method" additive polymer products (molding powders, molding pearls, molding granules, etc.) have been successfully converted to high optical grade additive polymer sheet. Practically all high optical grade sheet is produced by the "bulk polymerization method."

The particular variant of the "bulk polymerization method" which is employed for the manufacture of high optical grade sheet is sometimes referred to as a casting process. Aside from the fact that the ultimate object of the "emulsion method" is usually a polymer powder (which is conveniently obtained by the dispersion of the polymerizable material in an immiscible medium), and the fact that the ultimate object of the "solution method" is a polymeric material which is capable of dissolution in a solvent phase, the logic served by these two methods is a sharper control over the polymerization temperature. The discontinuous phase and the solvent phase respectively in each of these two processes provides the thermal inertia on which sharper temperature control is based. The absence of a source of thermal inertia in the bulk polymerization method provides the basis for the exceptionally acute temperature control problem which is usually encountered in this particular additive polymerization procedure.

In general, the additive polymerizations are characterized by high exothermic heats of reaction which, in the face of the poor heat exchange conditions, provided by a resinous mass, elevates the problem of temperature control to critical proportions.

In most "bulk polymerizations," the problem of heat transfer across exchange surfaces is further complicated by the changing conditions provided by the conversion of liquid monomeric materials to solid polymer end products. The acuteness of the temperature control problem is best illustrated in the "bulk polymerization" of the methyl methacrylate to high optical grade sheet. Improper control over the conditions of this polymerization problem will result in the formation of sheet in which bubbles, ripples or haze occur, or in which two or more of these conditions occur.

It is generally recognized that bubbles or ripples are almost always due to either a local or uniform excessive temperature condition. Haze, which is a quality of opaqueness, is associated with either excessive or low temperatures of polymerization. My study on the nature of haze indicates that they may be due to a precipitation of polymer from solution in the monomer, and/or to a rate of polymer formation which is in excess of the rate of dissolution of the polymer in the monomer, which acts as the solvent phase throughout the bulk polymerization.

Haze in the final bulk polymerization product may also be due to the presence of impurities in the monomer which are soluble therein but which are not miscible with or soluble in the polymer. Such diluents of the monomer become important mol fractions of the residual monomer as the polymerization progresses and achieve critical values so far as the ability of the residual monomer to take polymer into solution are concerned. By this process of "over-extension" of the solvent capacity of the residual monomer there results a precipitation of polymer and the consequent production of the quality of opaqueness, which will hereafter be referred to as haze in the finished product.

The problem of haze formation is particularly acute in the bulk polymerization of methyl methacryate and other additive polymer materials when extremely high molecular weight polymers are present or desired. This condition arises from the consideration that in any specific solvent, the solubility of any one of a series of homologous compounds decreases as the molecular weight of the homolog in question increases. Although my invention has a particular bearing upon the bulk type of polymerization, it also is important with regard to "emulsion" and "solution" types of polymerizations.

The characteristic of haze formation in the casting of sheets as has been noted above is significant of the production of a quality of discontinuity within the structure of the polymer material due to the formation of precipitated polymer. Since my invention relates to means for sharper control over the temperature of polymerization as well as the rate at any given time during the process of polymer formation and since both of these critically affect the formation of haze, my invention also bears upon the production of additive polymers by the "emulsion" and "solution" techniques.

The primary object of my invention is to provide an improved process by which additive polymerization operations may be carried out at temperatures considerably above the usual temperatures which are consistent with the prevention of such defects as are mentioned above, in order to reduce the overall polymerization time cycle.

A further object of my invention is to provide an adjustable method of catalysis for additive polymerizations which permits a planned coordination of temperature with rate of polymer formation, thereby preventing the occurrence of haze or other discontinuities in the finished product.

A still further object of my invention is to provide an improved process for additive polymerizations which will permit wide variations in the proportion of catalyst used to obtain thereby any value desired for the average molecular weight of the polymer product without sacrificing the optimum conditions of temperature for the production of a completely homogenous and defect-free polymer product.

Another object of my invention is to provide an improved process by which one can obtain higher average molecular weight materials in clear or transparent additive polymer materials while still maintaining the clarity and light-transmission properties obtainable with lower average molecular weight materials.

Another object of my invention is to provide an improved method for the catalysis of additive polymerizations to the end that a reduction in the dispersion of molecular weights about the mean molecular weight is accomplished.

In the course of my work on additive polymerizations, with particular regard to the elimination of haze as a characteristic in methyl methacrylate sheet, I have discovered that haze is progressively eliminated as an end product characteristic as one employs progressively higher temperatures for the polymerization process. I have further discovered that even at high temperatures, an excessive rate of polymer formation (with regard to the rate of solution of the polymer in the monomer) will result in some degree of haze. I have also discovered that if a "slow" organic peroxide catalyst, as defined below, is properly coupled with a "fast" organic peroxide catalyst, such as the commonly used benzoyl peroxide, there results a sharp ability to programme the rate of polymerization center formation so that a proper coordination of desired temperature of polymerization with rate of polymer formation is established.

Another discovery resulting from my investigations is that the coupling of the "fast" and the "slow" catalysts in the manner referred to above will avoid the production of bubbles and ripples at a given temperature, even though the amount of "fast" catalyst used by itself would be sufficient to cause bubbles and ripples if it (alone) were used at the same temperature.

In accordance with these discoveries, my invention, therefore, includes the use of a "slow" catalyst, that is, one which decomposes into radicals at a given temperature at a slower rate, in such a mixture with a "fast" catalyst, one which decomposes into radicals at the same temperature at a greater rate, that the polymerization operation may be carried out at such temperatures, usually high ones, and such programmed rates of polymer formation, so that haze in the finished product is either reduced or eliminated.

In the case of the bulk polymerization of methyl methacrylate to a haze-free, bubble-free, ripple-free sheet, a preferred form of the invention includes the use of tertiary butyl hydroperoxide, tertiary butyl perbenzoate and other "slow" organic peroxides or other materials which decompose slowly into radicals at relatively high temperatures (temperatures approaching the boiling point of the monomer), thereby permitting the carrying out of the polymerization operation at high overall temperatures without risking the formation of bubbles and ripples, and which, preferably, have the property of having their decomposition rates influenced by the presence of materials decomposing into free radicals at a fast rate at the same reference temperature, thereby permitting the adjustment of the rate of polymerization to the end that the rate of polymer formation is properly adjusted to the rate of dissolution of the polymer in residual monomer, thereby providing the optimum conditions for haze elimination.

The "fast" catalyst component may be benzoyl peroxide, acetyl peroxide, or any other organic peroxide or material which decomposes into free radicals at appreciably faster rates at the same reference temperature, and which, preferably, will influence the rate of decomposition of the "slow" catalyst to the required free radicals.

The "fast" catalyst, as referred to herein, is defined as any material which, at a given temperature, decomposes into free radicals at such a rate that the formation of the initiated monomer molecules occurs in a highly restricted interval as compared with the total polymerization cycle, while a "slow" catalyst, as referred to herein, is defined as one which decomposes into free radicals at the same reference temperature level, in such a manner that the initiation of the monomer molecules is distributed over a wider portion of the total polymerization cycle. In accordance with my invention the "fast" catalyst component of the catalyst mixture functions to give an early initiation of the polymerization cycle, and also may serve to catalyze the decomposition of the "slow" catalyst component by disturbing the initial dynamic equilibrium between the "slow" catalyst molecule and its break-down products.

Depending on the dispersion about the mean molecular weight desired, the optimum polymerization temperature for the given additive polymerization depends on the ratio of "fast" to "slow" catalysts. In instances where the "fast" catalyst does not exert a catalyzing influence upon the decomposition of the "slow" catalyst, the function of the "fast" catalyst is restricted to providing the initial centers of polymerization for the starting of the polymerization reaction, while the "slow" catalyst takes on the role of a "reservoir" of potential free radicals, and hence of further formation of polymerization centers.

The very property of the "slow" catalyst in decomposing over a wider range of the total polymerization cycle constitutes the basis of its "reservoir capacity." By this means, the amount of "fast" catalyst is limited to that amount which can be tolerated at the given temperature polymerization and also to such amounts as maintain the rate of the chain termination process at a minimum.

The total effect, therefore, combined with the slow rate of decomposition of the "slow" catalyst is to decrease the dispersion of molecular weights about the mean molecular weight. In some instances, the choice of the "fast" catalyst will revolve about not only its role in initiating the polymerization reaction, but in addition, its role as a catalyst for the decomposition for the "slow" catalyst. This catalysis is achieved partially in cases where peroxides are used as sources of free radicals according to the following series of equations:

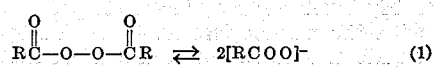  (1)

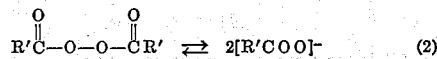  (2)

  (3)

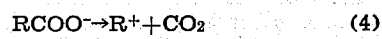  (4)

  (5)

If the peroxide in which the radical, $R^+$ appears is taken to be the "slow" catalyst and the peroxide in which $R'^+$ appears is taken to be the "fast" catalyst, both will, at any given temperature, break down according to the dynamic equilibria illustrated in Equations 1 and 2. The radicals, RCOO and R'COO both exhibit the tendency to decomposition according to Equations 3 and 4.

The slowness of the breakdown of the "slow" catalyst resides in the comparative stability of the RCOO$^-$ group, and hence in the ability to maintain the equilibrium illustrated in Equation 1 at some slowly changing level.

The ability of the R'COO group to decompose rapidly to the free radical $R'^+$ is the source of the rapidity of the breakdown of the "fast" catalyst. The ability of such $R'^+$ radicals to combine with RCOO radicals to yield the ester as shown in Equation 5 upsets the equilibrium in (1) and shifts the entire equilibria in favor of the decomposition of the RCOO$^-$ groups by urging a further decomposition of the "slow" catalyst.

The ability to accomplish this catalysis provides, in many additive polymerizations, the capacity to adjust the rate of decomposition of the "slow" catalyst with a comparatively small amount of "fast" catalyst, and hence the ability to establish or adjust the rate of polymerization at any desired level.

Since a product free of discontinuities due to polymer precipitation, since control over the dispersion of molecular weight about the mean molecular weight and since sharper control over the mean molecular weight are desirable process control characteristics in any type of additive polymerization, my invention applies not only to bulk polymerization where it is of greatest import, but to emulsion type and solution type polymerizations as well.

One of the important results of my discoveries is that the polymerization operation may be carried out over a much wider temperature range than has been found possible by the use of a single "fast" catalyst, while at the same time allowing a wide range in the stoichiometric ratio of catalyst to monomer. The use of the combined catalysts furthermore, has enabled me to produce polymer of any desired average molecular weight, as measured for example by the Staudinger method, within extremely wide ranges and consequently has enabled me to produce polymers of any desired physical properties within an extremely wide range of such properties as flexibility, toughness, tensile strength, etc.

My invention includes in general the use of any oxidation-reduction couple formed by the co-presence of a mixture of free radicals of different oxidation level for the purpose of achieving clarity and eliminating ripples, bubbles or haze or any combination of these adverse conditions, and also for the purpose of achieving (if desired), a higher molecular weight, with its related properties of higher tensile strength, lower water adsorption and increased resistance to weathering.

My invention may be illustrated in connection with the polymerization of certain specific materials as referred to in the following examples:

Example No. 1

This example illustrates the use of the improved method in connection with the production of a glass-like methyl methacrylate sheet approximately ⅛ inch thick which has an intrinsic viscosity of 1.98.

Methyl methacrylate was polymerized by using 0.030 part by weight of benzoyl peroxide as a "fast" catalyst component and 0.039 part by weight of tertiary butyl hydroperoxide as a "slow" catalyst component which were mixed with 100 parts by weight of the monomer. The mixture was then heated to a temperature slightly in excess of 85° C. and maintained at a temperature of from 85 to 90° C. for a period of approximately one hour. The temperature was controlled by the use of a water jacket. The end of this heating operation is determined by testing the mixture until it is possible to draw up a thin string from the batch by the use of a glass rod.

At this point the batch of material was transferred to molds which were partially filled, preferably after heating them to a temperature of 60° C. When the molds had been partially filled they were placed in an oven in which the temperature was maintained at from 80° to 85° C. for a period of about one hour. The end of this heating operation is indicated by the attainment of the gel state for all but a small portion of the mass in the molds.

When this gel state was reached the molds were transferred to an oven maintained at 60° C. for a period of about four hours. The termination of this heating operation is indicated when the mold clamps become loose as a result of the contraction of the mass during the polymerization operation. When this condition appeared the molds were transferred back to the higher temperature oven where they were heated at the 80° to 85° C. temperature for a period of two hours. At the end of this period the molds were air cooled for several minutes, then cooled with lukewarm water and finally with cold water in order to effect the separation of the polymer sheet from the mold.

The polymer sheet produced by the foregoing procedure was tested by the Staudinger method and found to have an intrinsic viscosity of approximately 1.98. It was of optical grade.

I have very successfully employed a type of mold comprising a rubber spacer shielded by cellophane wrapping and interposed between sheets of plate glass which are then clamped together under sufficient pressure to compress the rubber spacer. Such a mold may be readily filled with the mixture to be polymerized and it may be readily immersed in a water bath or set up vertically in an oven. The molds are preferably set up vertically but provision may be made for having them set horizontally.

Example No. 2

This example is similar to Example 1 except that the proportion of catalysts and conditions were varied so as to produce a methacrylate sheet ¼ inch thick.

Methyl methacrylate monomer was polymerized by using 0.020 part by weight of benzoyl peroxide and 0.044 part by weight of tertiary butyl hydroperoxide with 100 parts by weight of the monomer. The procedure used in carrying out operations of this example were the same as those used in Example No. 1 except that the initial processing of the material in the molds was extended for a period of about one hour and twenty minutes. Optical grade methyl methacrylate sheet glass was produced having an intrinsic viscosity of approximately 2.3.

Example No. 3

Methyl methacrylate monomer was polymerized with a catalyst mixture comprising 0.0042 part by weight of acetylperoxide and 0.051 part by weight of tertiary butyl perbenzoate. This mixture was incorporated in 100 parts by weight of the monomer and the resulting batch processed as in Example No. 1, except that in the initial processing of the molds at 80° to 85° C. the processing to the gel stage was continued for a period of about two hours.

In the combination of catalysts used in this example the acetyl peroxide is the "fast" component of the catalyst couple while the tertiary butyl perbenzoate is the "slow" component of the couple.

The polymer produced by this operation comprised methyl methacrylate glass sheet ½ inch thick having an intrinsic viscosity of approximately 2.43.

Example No. 4

Methyl methacrylate monomer, 100 parts by weight was polymerized with a catalyst mixture comprising 0.030 part by weight of benzoyl peroxide and 0.0937 part by weight of tertiary butyl hydroperoxide. These are the same catalysts as used in Examples 1 and 2 but in different proportions. The processing steps, however, were exactly the same as those of Example No. 1 and the product produced was approximately ⅛ inch thick, methyl methacrylate sheet of optical grade having an intrinsic viscosity of approximately 1.9.

Example No. 5

In this operation 100 parts by weight of styrene monomer were intimately mixed with 0.350 part by weight of tertiary butyl hydroperoxide and 0.070 part by weight of benzoyl peroxide. The mixture was subjected to a prepolymerization heating similar to that in Example No. 1, at a temperature of approximately 120° C., without agitation for a period of about 45 minutes to get to the stringy state. The viscous syrup which resulted from this treatment was then poured into molds of the type described under Example No. 1. The molds were then tightened up and placed in an oven where they were heated for a period of about one hour at a temperature of 115° to 120° C. When the polymerization mixture had for the most part assumed a gelatinous condition the molds were transferred to an oven maintained at about 100° C., and kept there for an extended period of 20 hours or more.

A hard polymer sheet was obtained by this operation with a degree of light transmission comparable to that of the methyl methacrylate sheet produced by the foregoing examples. The polystyrene sheets in the molds were cooled and removed by a procedure similar to that described in Example No. 1. The sheet made by this process was ¼ inch thick and free from haze or opaqueness.

*Example No. 6*

A styrene monomer, 100 parts by weight was mixed with 0.330 part by weight of tertiary butyl hydroperoxide and 0.100 part by weight of benzoyl peroxide. The mixture was processed in accordance with the procedure of Example No. 5 and polystyrene sheet ¼ inch thick and of optical grade were produced.

*Example No. 7*

In accordance with this example, the proportions of the catalysts were varied again, 100 parts by weight of styrene monomer being processed with 0.500 part by weight of tertiary butyl hydroperoxide and 0.100 part by weight of benzoyl peroxide. The procedure was the same as in Example No. 5 and a clear optical grade polystyrene product was obtained having a high light transmission. In fact all of the polystyrene sheets produced by Examples 5, 6 and 7 had approximately as high a light transmission as the methacrylate sheets which were tested and found to have a light transmission of 94% at a minimum.

In the foregoing examples the proportions of catalyst components were based upon the use of solid benzoyl peroxide, the use of acetyl peroxide dissolved in dimethyl phthalate so that an ultimate free oxygen value of 4% was obtained, tertiary butyl hydroperoxide dissolved in dimethyl phthalate so that an ultimate free oxygen value of 6% was obtained, and tertiary butyl perbenzoate dissolved in dimethyl phthalate so that an ultimate free oxygen value of from 8 to 8½% was obtained. The examples of catalyst components used are cited primarily for purposes of illustration, benzoyl peroxide being a "fast" catalyst commonly employed in the polymerization of methacrylate monomers. In accordance with the invention the use of two or more catalyst components which form a couple is contemplated, the couple including a "fast" catalyst and a "slow" catalyst, the proportions of which may be varied to permit the utilization of elevated temperatures, which in turn contributes greatly to the successful manufacture of clear optical grade polymer. However, the concepts of "fast" and "slow" catalysts may be referred to any temperature at which the polymerization system is processed.

The proportions of the "fast" and "slow" catalyst components may be varied in accordance with the conditions desired for the processing and the characteristics desired in the final product, within the physical limitations imposed by the material. In general it is desirable, both from the standpoint of speed of polymerization and of haze-formation to work at temperatures as close to the boiling point of the monomer as is possible, and to use a sharply reduced overall processing time.

While the examples given above show the application of the principles of the invention to the polymerization of methyl methacrylate and styrene, the same principles are applicable to the polymerization of other materials, such as vinyl acetate, vinyl chloride, other vinyl compounds, esters of acrylic and methacrylic acids, the copolymerization of these materials and of methyl methacrylate and styrene as well as other examples of additive polymerization in which the focal point of the process are olefinic or acetylenic linkages, or both.

My discovery with respect to the use of "fast" and "slow" catalyst components in relation to polymerization conditions as described above may be applied to emulsion and solution polymerizations as well as to bulk polymerizations of the type illustrated by the foregoing examples.

The molds used for retaining the polymer mixture during the polymerization operation may be of any desired form or shape depending upon the use to which the hard polymer product is to be put. Sheets of various thickness may be made and may be used for a variety of purposes, and the process may be varied according to the end use of the polymer product.

The improved process has resulted in the production of optical grade polymer products which are free from haze or opaqueness and do not contain bubbles, ripples or other defects. Various theories may be advanced to account for the phenomenon of haze in polymers, but the invention is not dependent upon the correctness of any such theory. It is possible, however, that haze may be caused either by the precipitation of polymer from solution in monomer during the polymerization operation, as referred to above, or by the failure of newly formed polymer to dissolve rapidly enough in the residual monomer to keep step with the progression of the polymerization, or by both of these actions. In any case the improved process avoids the production of products containing haze. The procedure permits the use of high temperatures and according to my theory presents a method for adjusting the rate of polymer formation so that the residual monomer is able to take it into solution in such a manner that no haze is produced. The higher temperatures possible by the process furthermore not only aid in eliminating haze but also shorten the polymerization time.

It is not intended, however, that in every instance there will result a shortening of the polymerization cycle since the average rate of decomposition of the catalysts may be of such an order as to compensate for or offset the higher energy level of the system as a whole, which is induced by higher temperatures. The shortening which has been obtained in the processing cycle in certain instances is appreciable when compared with operations where "fast" catalysts such as benzoyl peroxide alone are employed. The use of such "fast" catalysts alone necessitates the employment of reduced temperatures in order to take care of the heat transfer problem.

An important advantage, obtained by adjusting the rate of break-down of a "slow" catalyst by the use of certain amounts of a "fast" catalyst therewith, is the distribution of the formation of initiated molecules over an extended period of time, thereby avoiding the necessity of dealing with "peak" heat-of-reaction loads at critical periods during the polymerization process. In other words the adjustment of the rate of break-down of the "slow" catalyst evens out or distributes the heat of polymerization load. This adjustment also serves to relieve the intensity of the general interruption phenomenon which would otherwise result from the concentrations in time of the monomer molecules initiated during a limited portion of the polymerization cycle, thereby tending to give a lower dispersion of polymer chain molecular weight about the mean molecular weight. A proper mixture of "slow" and "fast" catalyst components therefore can be used to either reduce the dispersion about the mean molecular weight, or, if desired, to produce predetermined dispersions about the mean molecular weight of the polymer.

The adjustment of the rate of decomposition of the "slow" catalyst by using the proper proportions of the "fast" catalyst is an important factor and gives an effective procedure by which wide variations in the molecular weight of the polymer may be achieved by the use of a wide range of catalyst to monomer ratios. Since the concentration of catalyst determines the number of polymerization centers extant at any time the concentration of catalyst determines the molecular weight at any given set of polymerization time temperature conditions. Where "fast" catalysts alone are used, the tendency for them to decompose over a small portion of the total polymerization time not only tends to negate the effects of using large concentrations of catalyst by increasing the number of chain terminations, but also tends to complicate the temperature control problem.

The advantages referred to above are illustrated in connection with the unusual results obtained in the production of polystyrene sheets (Examples Nos. 5, 6 and 7). These results are believed to be attributable to the control of the decomposition of the "slow" catalyst by the use of particular amounts of "fast" catalyst therewith so that a sufficient number of free radicals were formed towards the end of the polymerization cycle, thereby providing for a comparatively rapid take-up of residual monomer. This appears to account for the fact that the polystyrene sheet, as produced in accordance with the foregoing examples, did not demonstrate the "monomer disease" characteristics, which is a characteristic opaqueness and light scattering phenomenon which appears on the aging of the polymer, and which is common to polystyrene made by the use of "fast" catalysts alone. Where "fast" catalyst are used alone, the bunching up of the initiation of monomer molecules around a restricted portion of the polymerization cycle results in a high degree of chain interruption and a restriction of the number of growing chains towards the end of the polymerization cycle to such a limit that there results a poor ability of the system to take up the residual monomer.

Having described my invention in its preferred form in connection with examples illustrating the same, I intend to cover the various modifications to which my invention is reasonably applicable according to the scope of the appended claims.

What I claim as new is:

1. In the manufacture of clear methyl methacrylate glass, the improvement which comprises mixing methyl methacrylate monomer with a polymerization catalyst mixture consisting of about 0.039 part by weight of tertiary butyl hydroperoxide and about 0.030 part by weight of benzoyl peroxide per 100 parts by weight of the methyl methacrylate, polymerizing the methyl methacrylate monomer in the presence of the catalyst mixture at a temperature of from about 85° to 90° C. for a period of time until the polymerization mixture reaches the string stage, thereafter continuing the polymerization of the mixture in a heating zone maintained at a temperature of about 80° to 85° C. for a further period of time until the polymerization mixture reaches a gel stage, thereafter subjecting the resulting gelled polymerization mass to further polymerization in a heating zone maintained at a temperature of about 60° C. for a period of time until the polymerization mass contracts, and thereafter carrying out the polymerization of the mass for a further period of time at a temperature of from about 80° C. to 85° C. until the mass is converted to a glass, thereby producing a clear polymer glass free of haze.

2. In the manufacture of clear methyl methacrylate glass by the catalytic polymerization of methyl methacrylate monomer, the improvement comprising mixing the methyl methacrylate monomer to be polymerized with a catalyst consisting of about 0.030 part by weight of benzoyl peroxide and about 0.039 part by weight of tertiary butyl hydroperoxide per 100 parts by weight of methyl methacrylate monomer, polymerizing the monomer in the presence of the catalyst components at a temperature of from about 85° to 90° C. for a period of time until the polymerization mixture reaches the string stage, placing the mixture in a mold and heating the mold and mixture therein in a heating zone maintained at a temperature of from about 80° to 85° C. for a period of time until the mass of the mixture in the mold attains a gel stage, thereafter conducting the polymerization of the gelled mass in the mold in a heating zone maintained at a temperature of about 60° C. for a further period of time until the mass in the mold contracts, and thereafter carrying out the polymerization of the mass in the mold for a further period of time in a heating zone maintained at a temperature from about 80° to 85° C. until a substantially hard product is formed, thereby producing a clear polymer glass free of haze.

ABRAHAM BROTHMAN.

REFERENCES CITED

The following references are of record in the file of this patent:

UNITED STATES PATENTS

| Number | Name | Date |
| --- | --- | --- |
| 2,044,579 | Kuettel | June 16, 1936 |
| 2,109,595 | Marks | Mar. 1, 1938 |
| 2,241,415 | Moulton | May 13, 1941 |
| 2,271,384 | Arnold | Jan. 7, 1942 |
| 2,356,767 | Kropa | Aug. 29, 1944 |
| 2,400,041 | Dickey | May 7, 1946 |
| 2,403,758 | Rust | July 9, 1946 |
| 2,409,633 | Kropa | Oct. 22, 1946 |
| 2,426,476 | Vaughan | Aug. 26, 1947 |
| 2,444,655 | Kroeker et al. | July 6, 1948 |

FOREIGN PATENTS

| Number | Country | Date |
| --- | --- | --- |
| 604,544 | Great Britain | July 6, 1948 |